US008579682B2

(12) United States Patent
Ebert et al.

(10) Patent No.: US 8,579,682 B2
(45) Date of Patent: Nov. 12, 2013

(54) DISPLACER FCA Y

(71) Applicant: Poly-clip System GmbH & Co. KG, Hattersheim (DE)

(72) Inventors: Detlef Ebert, Bad Nauheim (DE); Michael Hummel, Raunheim (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 13/667,831

(22) Filed: Nov. 2, 2012

(65) Prior Publication Data
US 2013/0122792 A1 May 16, 2013

(30) Foreign Application Priority Data
Nov. 3, 2011 (EP) .................................... 11008764

(51) Int. Cl.
*A22C 11/00* (2006.01)

(52) U.S. Cl.
USPC .......................................................... 452/48

(58) Field of Classification Search
USPC ............ 452/21–26, 30–32, 35–37, 46–48, 51
See application file for complete search history.

(56) References Cited

U.S. PATENT DOCUMENTS

| 5,109,648 | A | * | 5/1992 | Evans | ........................ 53/134.1 |
| 5,755,022 | A | * | 5/1998 | Whittlesey | ..................... 29/788 |
| 6,484,474 | B1 | | 11/2002 | Knieriem | |
| 7,331,155 | B2 | * | 2/2008 | Topfer | ........................ 53/138.2 |
| 7,434,368 | B2 | * | 10/2008 | Haschke et al. | ............. 53/135.1 |
| 7,618,307 | B2 | * | 11/2009 | Gladh | ............................. 452/51 |
| 8,308,533 | B2 | * | 11/2012 | Haslacher | ....................... 452/32 |
| 2003/0005664 | A1 | | 1/2003 | Topfer | |
| 2008/0085668 | A1 | | 4/2008 | Ebert et al. | |

FOREIGN PATENT DOCUMENTS

EP  1 886 573 B1  2/2008

* cited by examiner

*Primary Examiner* — Richard Price, Jr.
(74) *Attorney, Agent, or Firm* — Hahn Loeser & Parks LLP

(57) ABSTRACT

The invention relates to a clipping machine for partitioning and closing a tubular packaging casing accommodating a filing material, and in particular sausage meat. The clipping machine comprises at least a first and second displacer element pair which in relation to an axis of the tubular packaging casing are arranged axially one after the other, and, which comprise each an upper displacer element and a lower displacer element. Each pair of the displacer elements are linearly reversibly movable in a first and second plane from an open position to a closed position. A first linear guidance comprises a first and second guiding rod for guiding the two pairs of the displacer elements. The first and second guiding rods are positioned in a plane parallel to the first and second plane of the first and second pairs of the displacer elements.

14 Claims, 21 Drawing Sheets

DISPLACER FCA Y

This application claims priority to, and the benefit of, European Patent Application No. 11 008 764.0-1260 filed Nov. 3, 2011 with the European Patent Office, which is hereby incorporated by reference.

BACKGROUND OF THE INVENTION

The present invention relates to a clipping machine for partitioning and closing a tubular packaging casing accommodating a filing material.

In particular, the invention concerns a clipping machine for partitioning and closing a tubular packaging casing accommodating a filing material, in particular sausage meat, with at least a first and second displacer element pair. The displacer element pairs are arranged axially one after the other in relation to an axis of the tubular packaging casing, and comprise each an upper displacer element and a lower displacer element.

The displacer elements are linearly reversibly movable in a first and second plane from an open position, in which the displacer elements are in a maximum displacement to each other, to a closed position, in which the displacer elements are in a nearly minimum displacement to each other. Furthermore, the clipping machine also comprises a first linear guidance comprising at least a first and second guiding rod for guiding the two pairs of the displacer elements in the first and second plane during their reversible linear movement from the open position to the closed position. Also, a first drive mechanism for reversibly moving both pairs of the displacer elements from the open position to the closed position is being provided.

It is the usual practice in sausage production, to use for example automatic clipping machines for filling e.g. sausage meat via a filling tube into a flexible packaging material, like a tubular casing which is closed by a closure means, referred to as closing clip, at the first end. After the filling operation is concluded, a gathered plait-like portion, which is free of filling material, is formed by a displacer unit. Two more clips are then applied to that plait-like portion by a closing means. A first closing clip is applied to close the second end of the filled packaging material and a second closing clip is applied for closing the first end of the subsequent sausage product. Thereafter, said plait-like portion is severed between said two clips creating one complete sausage product and packaging material closed at its first end to be filled, in order to form the next sausage product. Such a practice for producing sausages is disclosed, for example, by EP-patent 1 886 573 B1.

In the production of sausage-shaped products, the design and size of clipping machines are very important. The smaller and compact a clipping machine the closer these clipping machines can be placed to the auxiliary machines, such as meat cutters or others. Also, the smaller and compact a clipping machine the more clipping machines can be fitted at a single production area.

However, clipping machines according to the prior art are not very compact and occupy a lot of space which could be used otherwise in the production area. Also, these spacious clipping machines are at the same time very heavy and therefore difficult to transport or just to move around the shop floor.

BRIEF SUMMARY OF THE INVENTION

The object of the present invention is to solve the above described problem. In particular, it is the object of the present invention to provide a clipping machine, with which the space occupied by the clipping machine can be reduced and a more compact clipping machine can be achieved.

What is proposed, in particular, is a clipping machine for partitioning and closing a tubular packaging casing accommodating a filing material, in particular sausage meat, with at least a first and a second displacer element pair. The displacer element pairs are arranged axially one after the other in relation to an axis of the tubular packaging casing, and comprise each an upper displacer element and a lower displacer element.

The displacer elements are linearly reversibly movable in a first and second plane from an open position, in which the displacer elements are in a maximum displacement to each other, to a closed position, in which the displacer elements are in a nearly minimum displacement to each other. Furthermore, the clipping machine also comprises a first linear guidance comprising at least a first and second guiding rod for guiding the two pairs of the displacer elements in the first and second plane during their reversible linear movement from the open position to the closed position. Also, a first drive mechanism for reversibly moving both pairs of the displacer elements from the open position to the closed position is being provided.

According to the present invention, it is proposed that the first and second guiding rod is positioned in a plane parallel to the first and second plane of the pairs of the displacer elements. By positioning the two guiding rods in a plane parallel to the first and second plane, the space occupied by the guidance, in particular the arrangement of the guiding rods is reduced. Also, the filling tube transporting the filling material into the casing material can be positioned closer to the clipping machine. Due to the design of the inventive clipping machine, the filling tube can in fact be positioned so close to the displacer elements that changing the casing material from and onto the filling tube can be achieved without having to turn the clipping machine away from the filling tube. Thus, the inventive clipping machine is an one-part-design without the need of a rotation axis for the closing means.

It is advantageous that the drive mechanism is essentially positioned between the first and second guiding rod, since positioning the drive mechanism in that very position is using the given space of the clipping machine most efficiently thereby reducing the overall space occupied by the entire clipping machine.

In addition to that, is also beneficial that the first and second guiding rod are linearly guided by the drive mechanism. By guiding or supporting the guiding rods only by the drive mechanism, no additional guiding facilities are required. Thereby, the overall number of components for the clipping machine is reduced and the space occupied by the machine is kept to a minimum. In a particular embodiment, it is also possible that the drive mechanism comprises a housing or the like which is in particular fulfilling the function of guiding or supporting the guiding rods linearly.

In another beneficial arrangement of the present invention, the first drive mechanism is formed as a rack-and-pinion-drive comprising at least a drive gear as well as at least a first and second linear bar gear. The embodiment of the drive mechanism as a rack-and-pinion-drive enables the first drive mechanism to be most compact as well as to transfer a rotary motion into a linear motion.

Beyond that, it is advantageous that the drive gear is driven by a driving rod. In that way a generated linear motion can be used to drive the first drive mechanism.

It is also possible in another beneficial embodiment of the present invention that the drive gear comprises at least a first and a second coupling location which are connected to the driving rod alternatively to each other. By this means, the position of the drive gear can be altered within the drive mechanism, for using more than the initial set of teeth of the drive gear and thereby ensuring a save function of the clipping machine.

Moreover, it is also advantageous that the second pair of the displacer elements is linearly reversibly movable between the closed position and the spread position in a third plane perpendicular to the first and second plane and that a second linear guidance is provided for guiding the second pair of the displacer elements in the third plane between the closed position and the spread position. By doing so, a plait-like portion can be generated after the casing material has been gathered by the displacer elements.

Also, it is beneficial to provide a second linear guidance for guiding the second pair of the displacer elements in the third plane between the closed position and the spread position.

In another advantageous arrangement, it is possible that the displacer elements are each provided with a connecting element connecting the displacer elements to the first and second guiding rod, in order to transfer the linear motion of the linear bar gears generated by the first drive mechanism to the first pair of the displacer elements.

In addition to that, is also beneficial that each connecting element comprises at least one adapter for holding the second linear guidance to transfer the linear vertical motion of the connecting elements to the second linear guidance.

Beyond that it is also possible that the second linear guidance comprises at least a first and second horizontal slide bar for synchronously guiding the two pairs of the displacer elements in the first and second plane during their reversible linear movement from the open position to the closed position as well as for guiding the second pair of the displacer elements in the third plane from the closed position to the spread position.

In order to additionally stabilize the second pair of the displacer elements during usage of the clipping machine, a third guiding rod is provided for guiding the second pair of the displacer elements in the first and second plane during their reversible linear movement from the open position to the closed position.

By providing at least a first and second linking element for linking the second pair of the displacer elements with the third guiding rod and respectively with each of the horizontal slide bars, it is possible to combine the vertical movement with the horizontal movement of the second pair of the displacer elements.

Also, it is possible that a guide unit is provided for guiding the first pair of the displacer elements and for stabilizing the first pair of the displacer elements during the usage of the clipping machine.

Finally, it is also beneficial that the first pair of the displacer elements comprises a reinforcing element and that the reinforcing element is essentially shaped as the upper displacer element, for placing the reinforcing element flat on top of the upper displacer element, in order to protect and stabilize the upper displacer element during the usage of the clipping machine.

Other advantages and one embodiment of the present invention shall now be described with reference to the attached drawings. The term "top", "bottom", "left", "right" used when describing the embodiment relate to the drawings orientated in such a way that the reference numerals and name of the figures can be read normally.

DETAILED DESCRIPTION OF THE INVENTION

The clipping machine 1 described in the following is used in the production of sausage products. It may also be used, of course, in the production of sausage-shaped products that are not foodstuffs, but for example, sealing compounds or adhesives.

The clipping machine and in particular its displacer unit 20, which will be described later in more detail, can basically be in three different positions, i.e. an open position, a closed position and a spread position. These three positions are necessary in the production of sausage-shaped products to produce a plait-like portion on a tubular packaging casing accommodating a filling material, in particular sausage meat, all of which are not shown here. The plait-like portion, having a nearly horizontal axis A, needs to be at least approximately free of filling material, in order to place two clips (not shown) thereon. After the two clips are being placed at the plait-like portion, the casing material is been severed between the two clips for separating the finished sausage product from the rest of the casing material. These two production steps of placing the clips and severing through the casing material will however not be described here. During the production of the sausage-shaped products, the filling material within the tubular packaging casing is running through the clipping machines in direction R parallel to the axis A.

Figure 1:
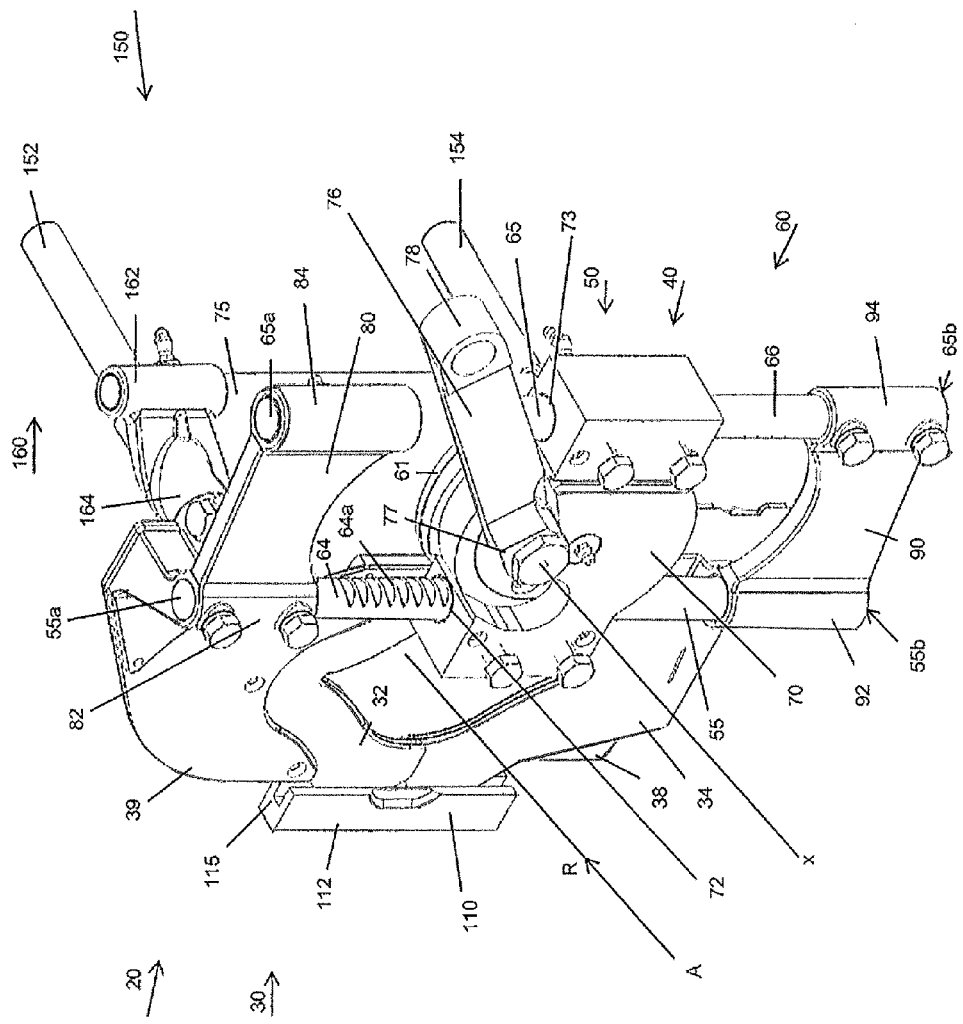
FIG. 1 shows a perspective view of an inventive clipping machine in an open position comprising a displacer unit, a first guidance and a second guidance.

FIG. 1 shows a schematic perspective view of the inventive clipping machine according to a preferred embodiment in an open position. The open position defines the first step to produce a plait-like portion on a tubular packaging casing, in which the tubular packaging casing accommodating a filling material is being moved in direction R towards the clipping machine and in particular inbetween the displacer unit 20.

The inventive clipping machine essentially comprises a displacer unit 20, a first guidance 40 and a second guidance 150.

The displacer unit 20 comprises a first and second pair of displacer elements 30, 35. Each pair of the displacer elements 30, 35 consists respectively of an upper displacer element 32, 34 as well as a lower displacer element 36, 38. The upper and lower displacer elements 32, 34, 36, 38 are made out of flat sheets of metal or other suitable materials. The upper and lower displacer elements 32, 34, 36, 38 are positioned essentially vertical, i.e. perpendicular to axis A, with their flat surfaces one after the other. In another possible embodiment it is also possible that the displacer elements are constructed with a double sheet construction, so that each displacer element comprises at least two sheets or plates fitted on top of each other.

The upper and lower displacer elements 32, 34 of the first pair of displacer elements 30 are thereby lying approximately in a first vertical plane whereas the upper and lower displacer elements 36, 38 of the second pair of displacer elements 35 are lying approximately in a second vertical plane. The first and second vertical planes are positioned parallel to each other and perpendicular to the axis A.

The displacer elements 32, 34, 36, 38 are reversibly vertical movable from an open to a closed position. Thereby, the upper and lower displacer elements 32, 34 of the first pair of displacer elements 30 are moving in the first plane and the upper and lower displacer elements 36, 38 of the second pair of displacer elements 35 are moving in the second plane.

In the open position, the upper and lower displacer elements 32, 34, 36, 38 are creating a clearance between them for the tubular packaging casing to pass through them along the axis A in direction R. When the displacer elements 32, 34, 36, 38 are in the open position, as shown in FIG. 1, the upper and lower displacer elements 32, 34, 36, 38 of both pairs 30, 35 are positioned respectively in the first and second plane and in a maximum displacement to each other.

The upper and lower displacer elements 32, 34, 36, 38 are reversible moving into the closed position, in order to gather the tubular packaging casing between them for creating a plait-like portion approximately free of filling material. In the closed position the upper and lower displacer elements 32, 34, 36, 38 are in a nearly minimum displacement to each other leaving a small clearance C between them in which the plait-like portion is positioned. The closed position of the upper and lower displacer elements 32, 34, 36, 38 is described in more detail later.

The displacer elements 32, 34, 36, 38 are arranged to each other along the direction R in such an orientation that the upper displacer element 32 of the first pair of the displacer elements 30 is positioned in front of the lower displacer element 34 of the first pair of the displacer elements 30 and the upper displacer element 42 of the second pair of the displacer elements 35 is positioned in front of the lower displacer element 44 of the second pair of the displacer elements 35.

Also, the upper displacer element 32 of the first pair of the displacer elements 30 comprises a reinforcing element 35. The reinforcing element 39 is essentially made out of a flat sheet of metal or another suitable material and basically sickle-shaped. The reinforcing element 39 is fitted essentially parallel and onto the upper displacer element 32 of the first pair of the displacer elements 30 and functions to reinforce, protect and stiffen the upper displacer element 32.

The first guidance 40 comprises a first drive mechanism 50, a first and second guiding rod 55, 65 as well as a first and second connecting element 80, 90. Moreover, as shown in this embodiment and in particular in FIGS. 1 and 4, there is the possibility that a third guiding rod 75 is provided.

The first guidance 40 has the essential function to move the upper and lower displacer elements 32, 34, 36, 38 of the first and second pair of the displacer elements 30, 35 reversibly vertical from the open to the closed position.

The first, second and third guiding rod 55, 65, 75 are in form of longitudinal bars and made out of metal or any other suitable material. The first, second and third guiding rod 55, 65, 75 are essentially in a vertical arrangement and perpendicular to the axis A. The first and second guiding rod 55, 65 are arranged one after the other in a direction perpendicular to the axis A and in a plane essentially parallel to the first and second plane of the displacer elements 32, 34, 36, 38. The first and second guiding rod 55, 65 are distanced from each other, to create a space between them, in which a drive mechanism 50, which will be described later in more detail, is positioned.

The third guiding rod 75 is essentially parallel to the first and second guiding rod 55, 65 and positioned behind the first guiding rod 55 in a direction parallel to the direction R. The third guiding rod 75 is distanced from the first and second guiding rod 55, 65, to create a space between them, in which additional components of the clipping machine or other devices, e.g. closing means can be positioned.

The drive mechanism 50 consists of a rack-and-pinion-drive 60 with a drive gear 61, as its pinion, as well as a first and second linear bar gear 64, 66, as racks: The drive gear 61 comprises a first and second coupling location 62, 63 and is positioned up-right and with its flat front-side parallel to the first plane in a gear-housing 70. A rotating axis X positioned at the centre 68 of the drive gear (pinion) 61 is essentially horizontal and parallel to the axis A.

Figure 2:
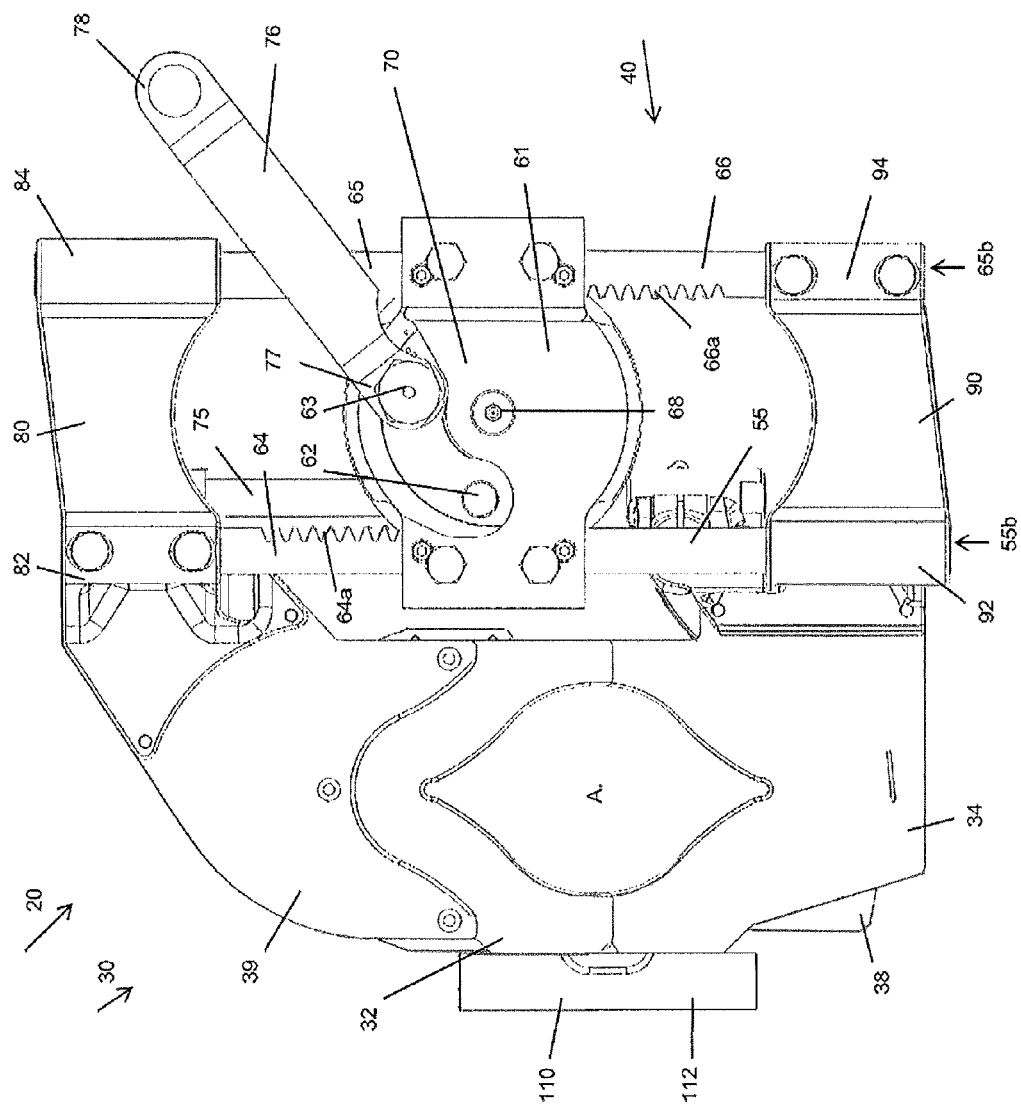
FIG. 2 shows a front view of the inventive clipping machine in an open position.
Figure 3:
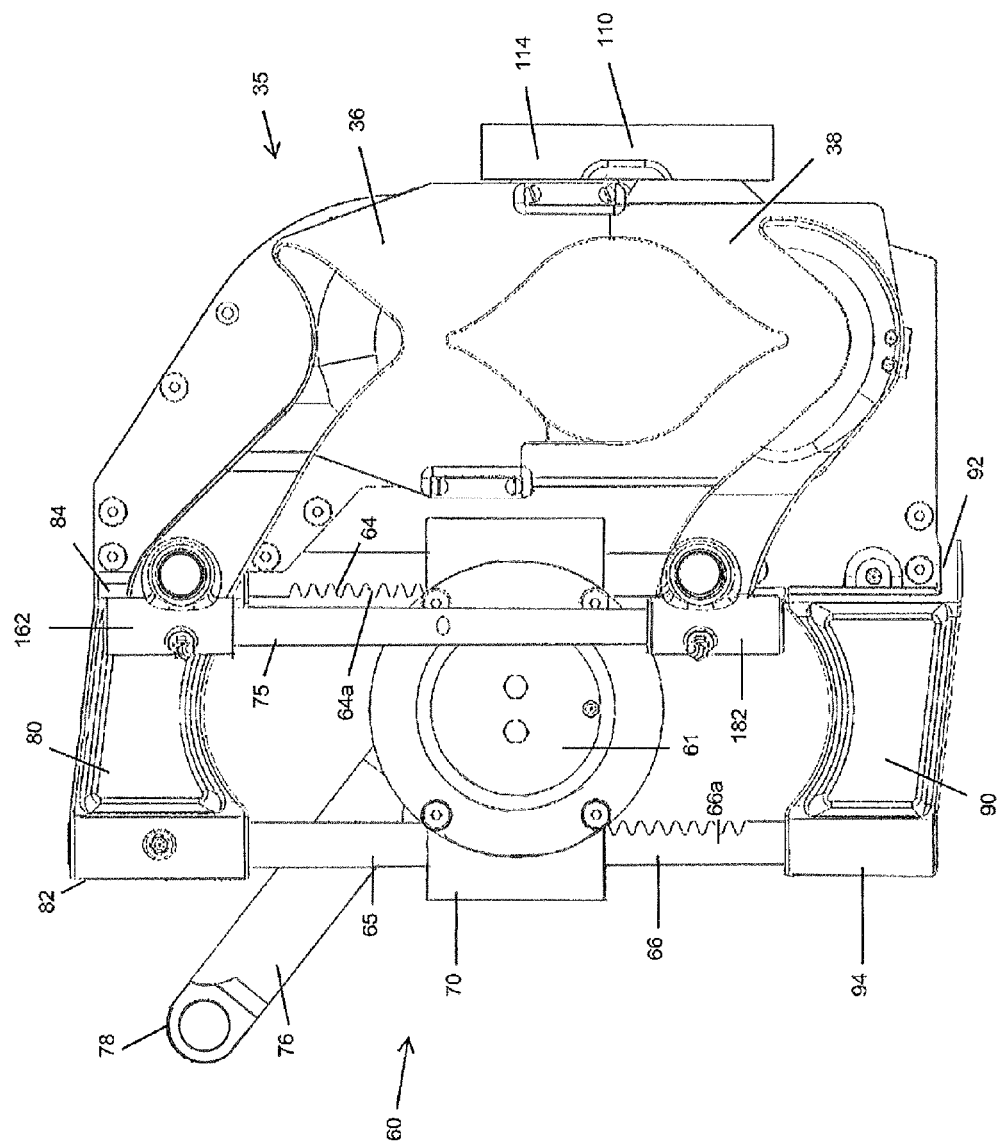
FIG. 3 shows a rear view of the inventive clipping machine in an open position.

As shown in FIG. 2, the gear-housing 70 comprises a semi-circular cut-out 71, in order to accessing the first and second coupling location 62, 63 of the drive gear 61. Beyond that, the gear-housing 70 also comprises a first and second vertical hole 72, 73 at each of its sides. The first guiding rod 55 is fitted in a vertical arrangement through the first vertical hole 72, whereas the second guiding rod 65 is fitted in a vertical arrangement through the second vertical hole 73. Thereby, the first and second guiding rod 55, 65 are guided or supported only by the gear-housing 70 and therefore no additional guiding or supporting facilities are necessary. However, it is also possible in an alternative embodiment of the inventive clipping machine that the guiding or supporting of the first and second guiding rod 55, 65 is achieved not necessarily by the gear-housing 70, but for example by the rack-and-pinion-drive 60 itself or any other suitable arrangement.

The first drive mechanism 50 also consists of a driving rod 76 essentially in form of a longitudinal lever having a first and second end 77, 78. The first end 77 of the driving rod 76 is connected to the first coupling location 62 of the drive gear

61. Alternatively, the first end 77 of the driving rod 76 can be connected to the second coupling location 63 of the drive gear 61. The driving rod 76 is reversibly driving the drive gear 61 which is rotatable around the rotating axis X in a rotary motion about 45° whereby the first and second linear bar gears 64, 66 (rack) are driven in a linear motion. As the drive gear 61 is only driven in a relatively short rotation when using the first guidance 40 for moving the displacer elements 32, 34, 36, 38 between the open and closed position (which will be explained later in more detail) after some time, i.e. more than 5 million cycles some wear is taking place at the teeth (not shown) of the drive gear 61. When the teeth of the drive gear 61 are worn at the position of intensive use, the gear-housing 70 can be opened, the driving rod 76 is detached from the drive gear 61 and the drive gear 61 can be turned to be installed so that a fresh and unworn set of teeth are interacting with the first and second linear bar gears 64, 66 (rack). When the drive gear 61 is turned to such a new position the second coupling location 63 is taking the place and function of the first coupling location 62.

The first, second and third guiding rod 55, 65, 75 are having each a first and second end 55*a*, 55*b*, 65*a*, 65*b*, 75*a*, 75*b* and function as guiding aids for the linear motion of the displacer elements 32, 34, 36, 38, of both pairs of the displacer elements 30, 35.

In this particular embodiment of the inventive clipping machine, the first and second guiding rod 55, 65 are also functioning as linear bar gears 64, 66 and therefore as the racks of the rack-and-pinion-drive. As a result, the first and second guiding rod 55, 65 each comprise teeth 64*a*, 66*a* on the side facing the drive gear 61, in order to interact with the teeth (not shown) of the drive gear 61 for being driven in a linear motion.

However, it is also possible in an alternative embodiment of the inventive clipping machine that the guiding rods 55, 65, 75 are not functioning as linear bar gears and that separate racks (linear bar gears) of the rack-and-pinion-drive are being provided. These extra racks (linear bar gears) can be positioned parallel to the first and second plane of the displacer elements 32, 34, 36, 38.

The first and second connecting elements 80, 90 of the first guidance 40 have the function to respectively connect the first and second pair of the displacer elements 30, 35 with the first and second guiding rod 55, 65. For that, the first and second connecting elements 80, 90 are each in form of a plate being in a vertical arrangement and thereby essentially parallel to the planes of the upper and lower displacer elements 32, 34, 36, 38. The first and second connecting elements 80, 90 comprise each a first and second vertical tube 82, 84, 92, 94 at each of their ends. Also, the first and second connecting elements 80, 90 comprise each a semi-circular cut-out 83, 93 matching respectively the top and bottom shape of the gear-housing 70.

The first end 55*a* of the first guiding rod 55 and the second end 65*b* of the second guiding rod 65 are each and respectively fixed to the first tube 82 of the first connecting element 80 as well as to the second tube 94 of the second connecting element 90.

Thereby, the second end 55*b* of the first guiding rod 55 and the first end 65*a* of the second guiding rod 65 are each and respectively slidable in the second tube 84 of the first connecting element 80 as well as in the first tube 92 of the second connecting element 90.

Figure 5:
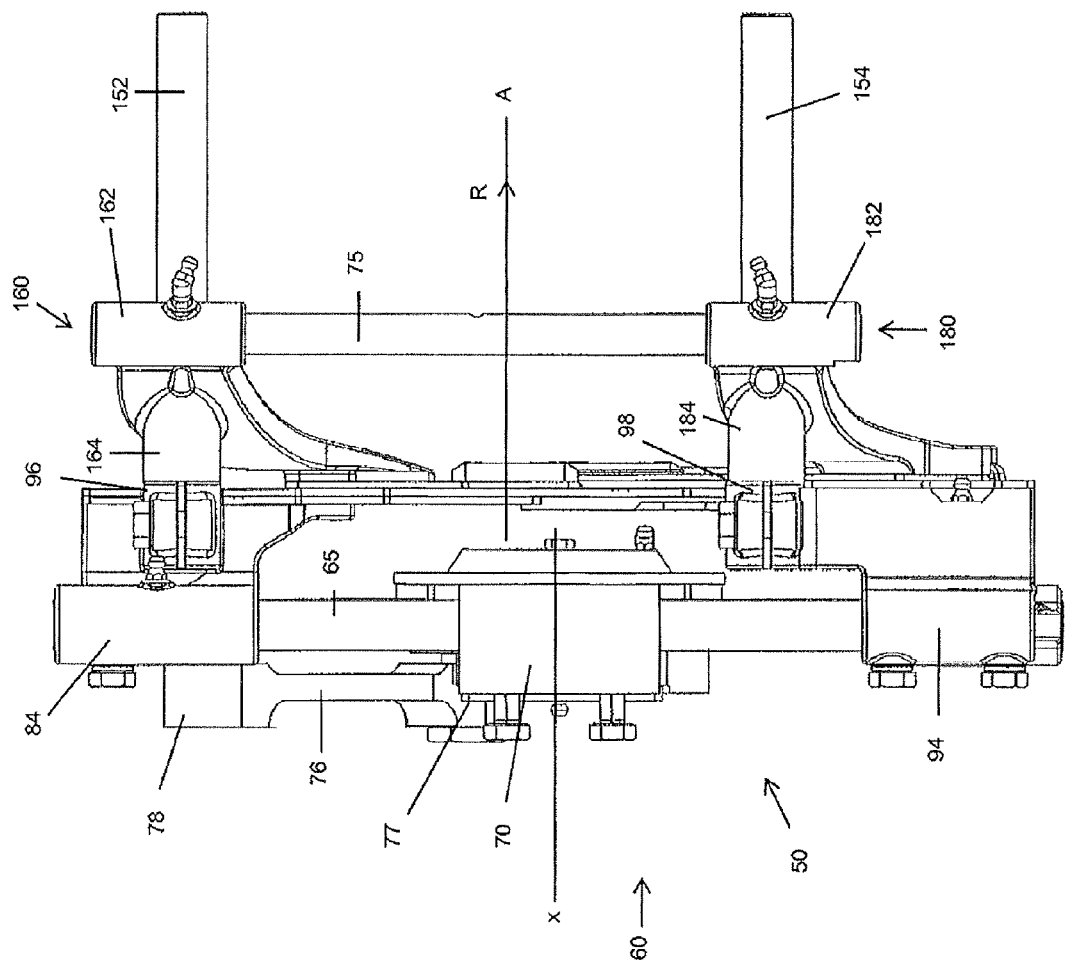
FIG. 5 shows a right-hand side view of the inventive clipping machine in an open position.
Figure 6:
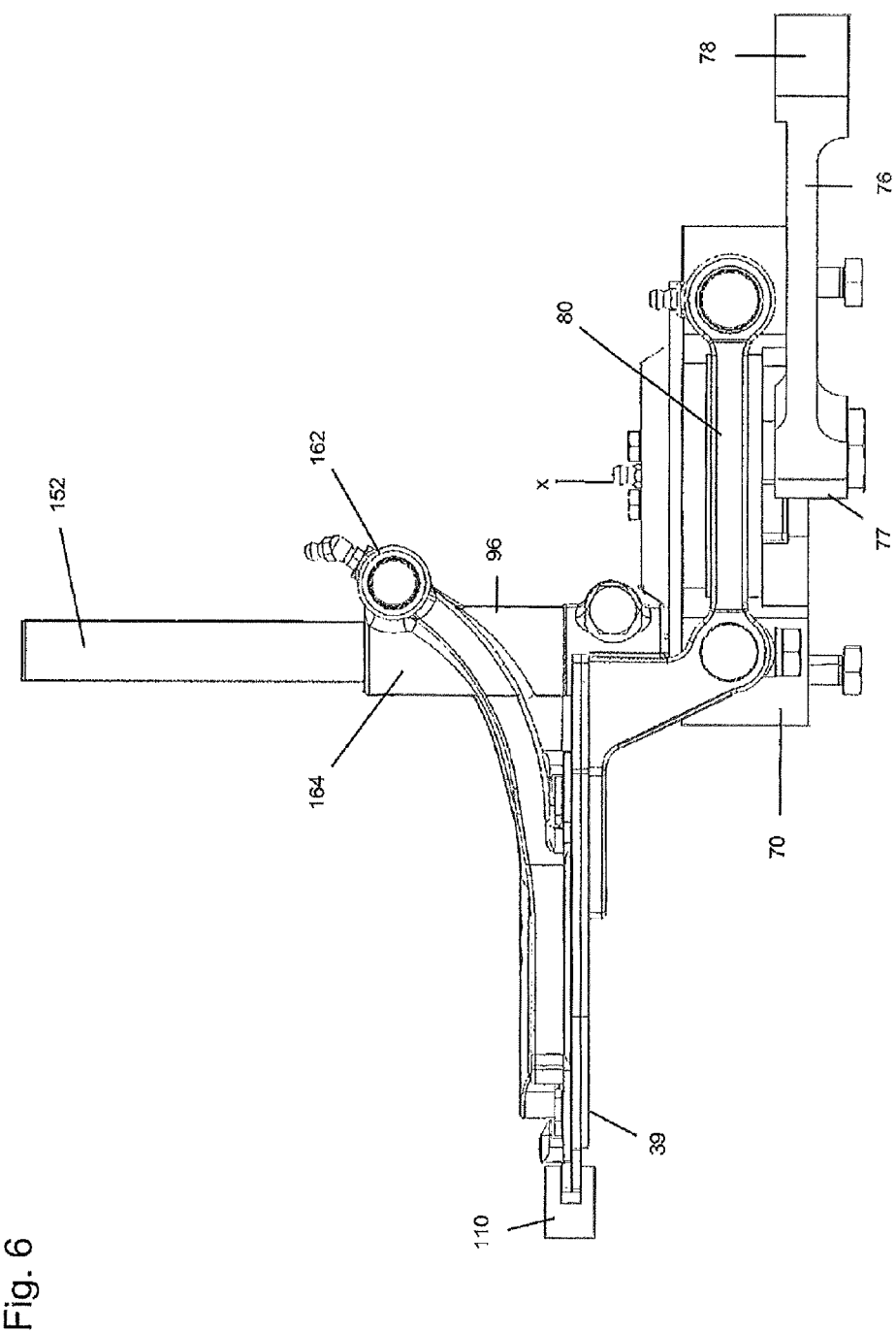
FIG. 6 shows a top view of the inventive clipping machine in an open position.
Figure 7:
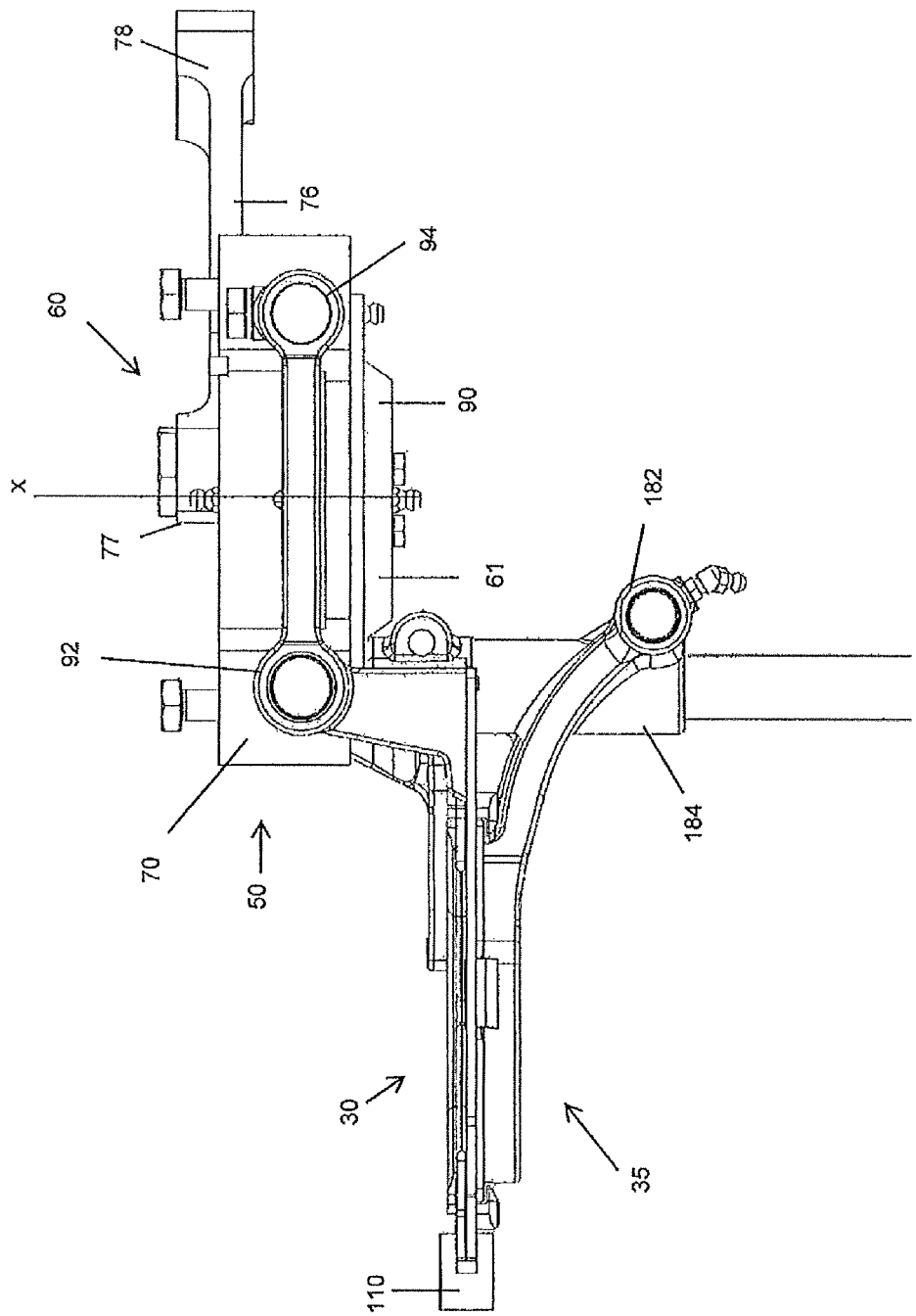
FIG. 7 shows a bottom view of the inventive clipping machine in an open position.

As shown in FIG. 5, the connecting elements 80, 90 also comprise each and respectively a first and second adapter 96, 98. The adapters 96, 98 are each in shape of a horizontal tube.

As shown in FIG. 1, a guide unit 110 is provided for guiding and stabilizing the upper and lower displacer elements 32, 34 of the first pair of the displacer elements 30. The guide unit 110 is essentially in the shape of a longitudinal block with longitudinal side-walls 112, 114 and with a longitudinal groove 115 running between the longitudinal side-walls 112, 114. The longitudinal sides 112, 114 of the guide unit 110 are approximately in a vertical orientation. The longitudinal groove 115 of the guide unit 110 is positioned at the free outer edge 32*a*, 34*a* of the upper and lower displacer elements 32, 34 of the first pair of the displacer elements 30, so that the side-walls 116, 117 of the groove 115 embrace the upper and lower displacer elements 32, 34 of the first pair of the displacer elements 30.

Figure 4:
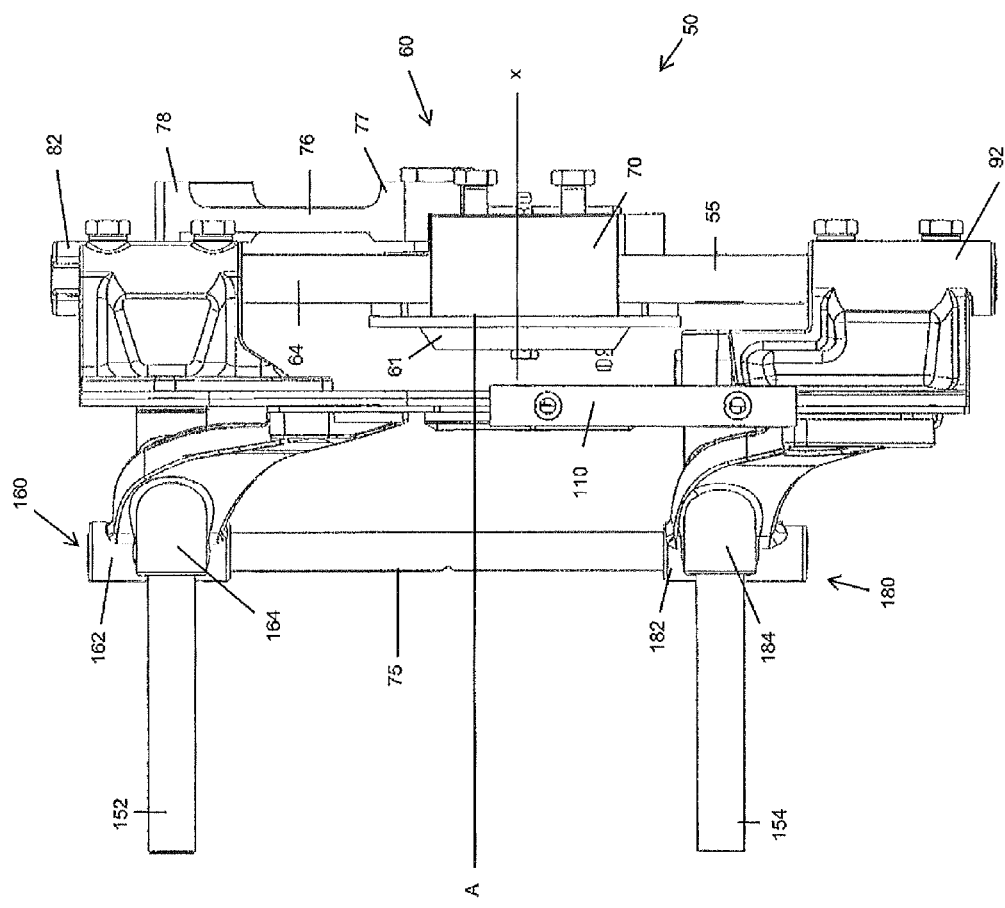
FIG. 4 shows a left-hand side view of the inventive clipping machine in an open position.
Figure 19:
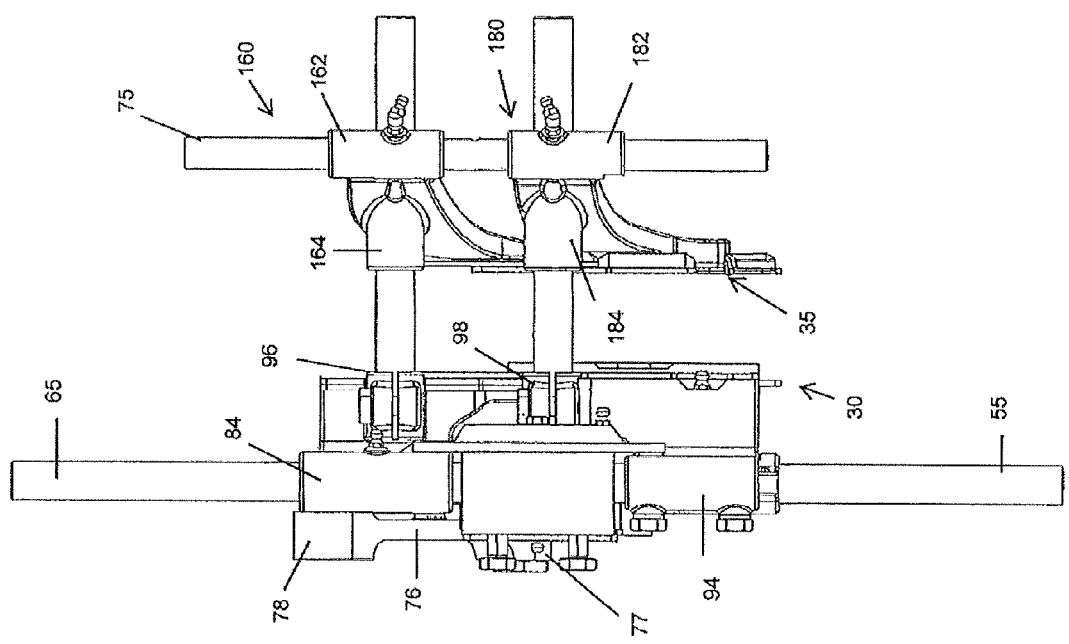
FIG. 19 shows a right-hand side view of the inventive clipping machine in a closed position.
Figure 20:
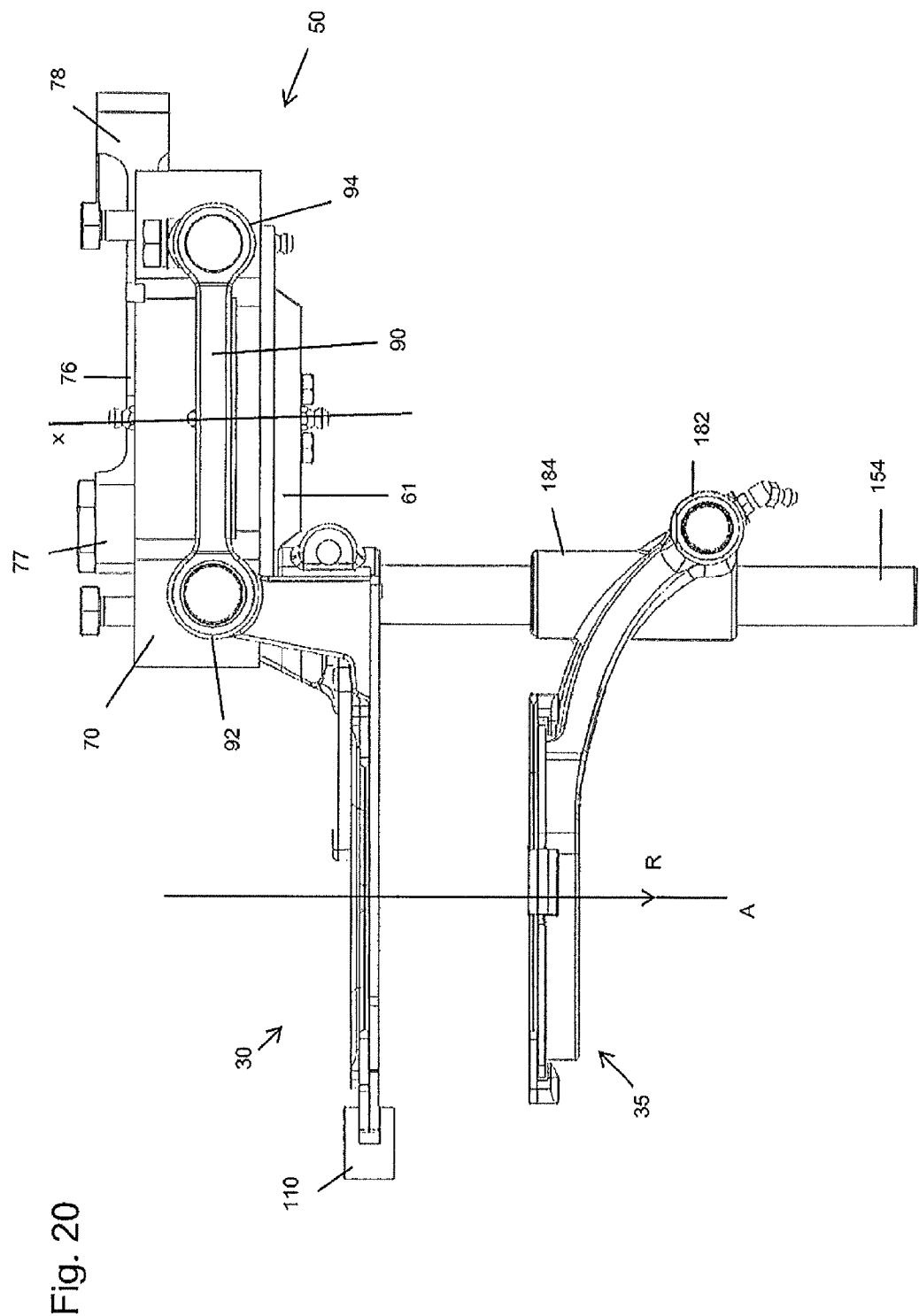
FIG. 20 shows a top view of the inventive clipping machine in a closed position.
Figure 21:
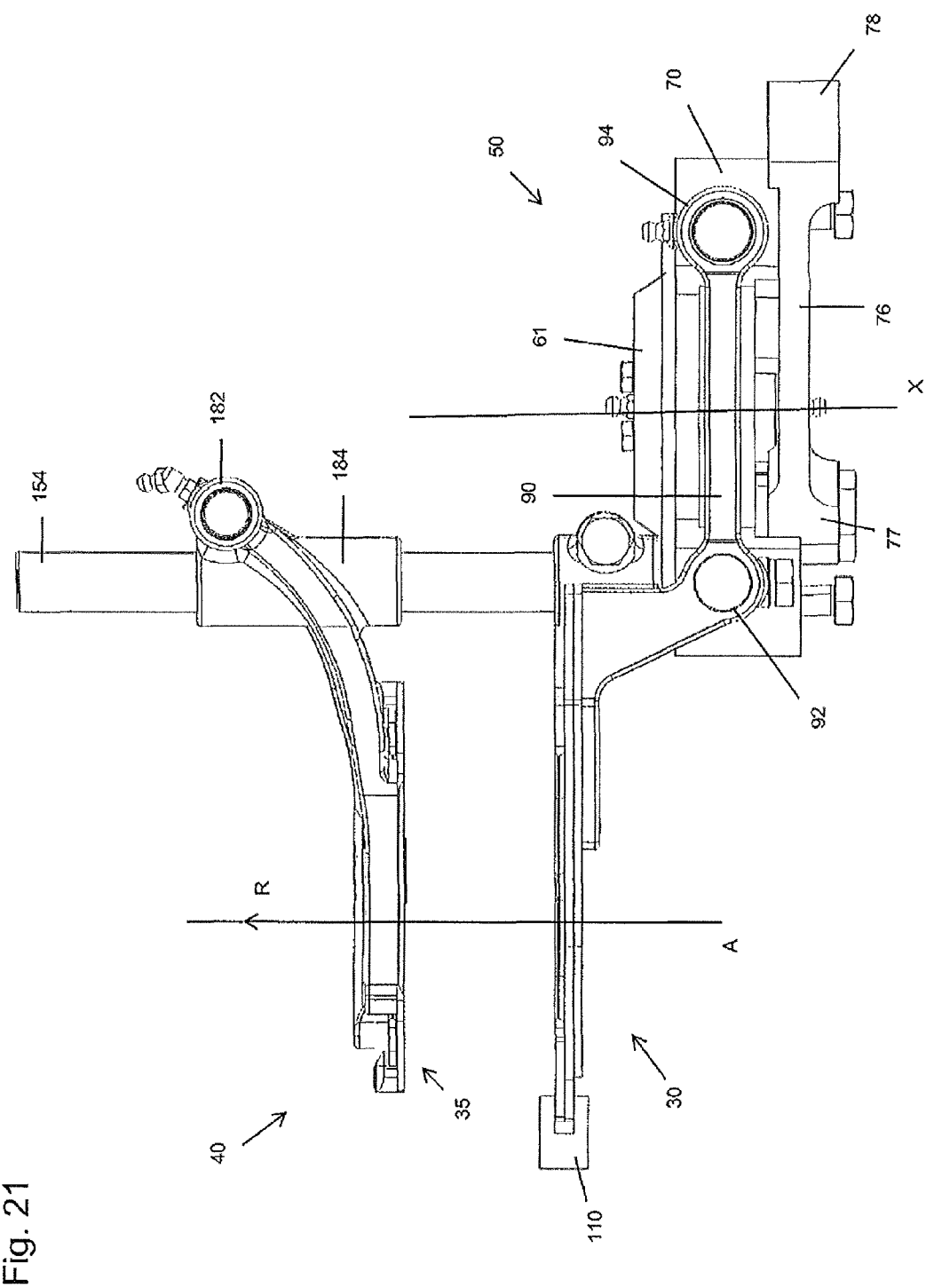
FIG. 21 shows a bottom view of the inventive clipping machine in a closed position.

The second guidance 150 comprises a first and second horizontal slide bar 152, 154 essentially in a horizontal arrangement and parallel to the axis A. The horizontal slide bars 152, 154 are in form of a cylindrical shaft having each a first and second end 152*a*, 152*b*, 154*a*, 154*b*. The horizontal slide bars 152, 154 are made out of metal or another suitable material. As shown in FIGS. 4 and 19 each of the horizontal slide bars 152, 154 is fixed respectively with their first ends 152*a*, 154*a* to the first and second adapter 96, 98 of each connecting element 80, 90.

The second guidance 150 has a first essential function to transmit the reversible linear movement of the upper and lower displacer elements 32, 34 of the first pair of the displacer elements 30 from the open position to the closed position towards the upper and lower displacer elements 36, 38 of the second pair of the displacer elements 35. Beyond that, the second guidance 150 has also a second essential function to allow the second pair of the displacer elements 35 to reversible move to the spread position.

The second guidance 150 also contains a first and second linking element 160, 180 consisting each of a first and second pair of bushings 162, 164, 182, 184. Each bushing 162, 164, 182, 184 is in shape of a cylindrical tube made out of metal or another suitable material. The bushing 162 is fixed with its cylindrical side-wall in a 90° orientation to the cylindrical side-wall of the bushing 164. Also, the bushing 182 is fixed with its cylindrical side-wall in a 90° orientation to the cylindrical side-wall of the bushing 184.

The linking elements 160, 180 are in such an orientation that the bushings 162, 182 are in a vertical arrangement and therefore parallel to the guiding rods 55, 65, 75. Consequently, the second bushings 164, 184 are then in a horizontal arrangement and therefore parallel to the axis A.

The first linking element 160 is linking the upper displacer element 42 of the second pair of the displacer elements 35 to the third guiding rod 75. Also, the second linking element 180 is linking the lower displacer element 44 of the second pair of the displacer elements 35 to the third guiding rod 75.

The linking elements 160, 180 are on the one hand able to slide vertically up and down the third guiding rod 75, as the third guiding rod 75 is fitted through the vertical bushings 162, 182. On the other hand the linking elements 160, 180 are able to slide horizontally along the horizontal slide bars 152, 154, as the horizontal slide bars 152, 154 are each and respectively fitted through the horizontal bushings 164, 184.

As the horizontal slide bars 152, 154 are fixed to the adapters 96, 98 of each of the connecting elements 80, 90, the vertical linear movement of the connecting elements 80, 90 and the first pair of the displacer elements 32, 34 generated by the drive mechanism 50 is transmitted by means of the horizontal slide bars 152, 154 and via the linking elements 160, 180 towards the second pair of the displacer elements 35.

A not shown second drive mechanism is provided for moving the second pair of displacer elements 35 reversibly from the closed position to the spread position. The second drive mechanism can be arranged to act upon the third guiding rod 75. In an alternative embodiment of the inventive clipping machine, in which no third guiding rod 75 is provided, the second drive mechanism can be arranged to act upon the first or second linking elements 30, 35 or to act upon both linking elements 160, 180 simultaneously.

The inventive clipping machine and in particular the displacer elements 32, 34, 36, 38 can be reversible moved from the open position to the closed position by means of the first guidance 40.

Figure 8:
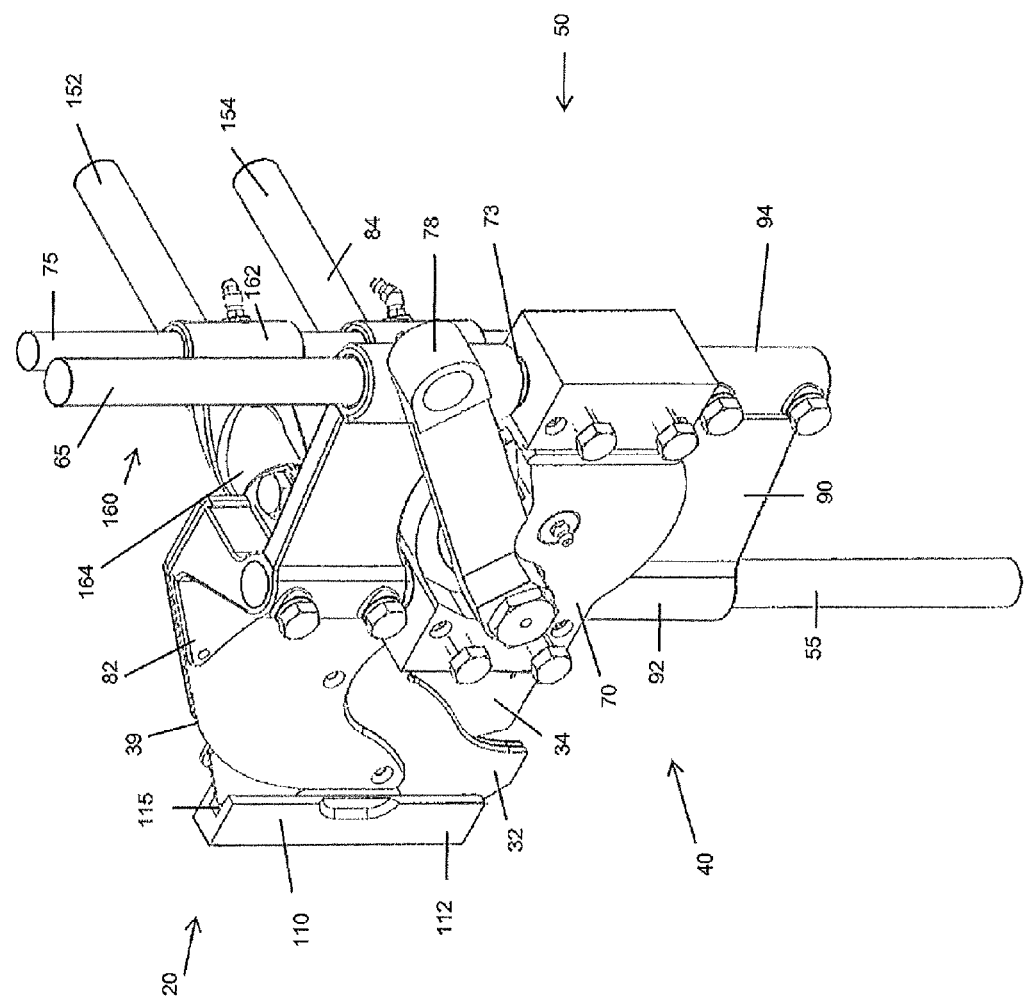
FIG. 8 shows a perspective view of the inventive clipping machine in a closed position comprising a displacer unit, a first guidance and a second guidance.
Figure 9:
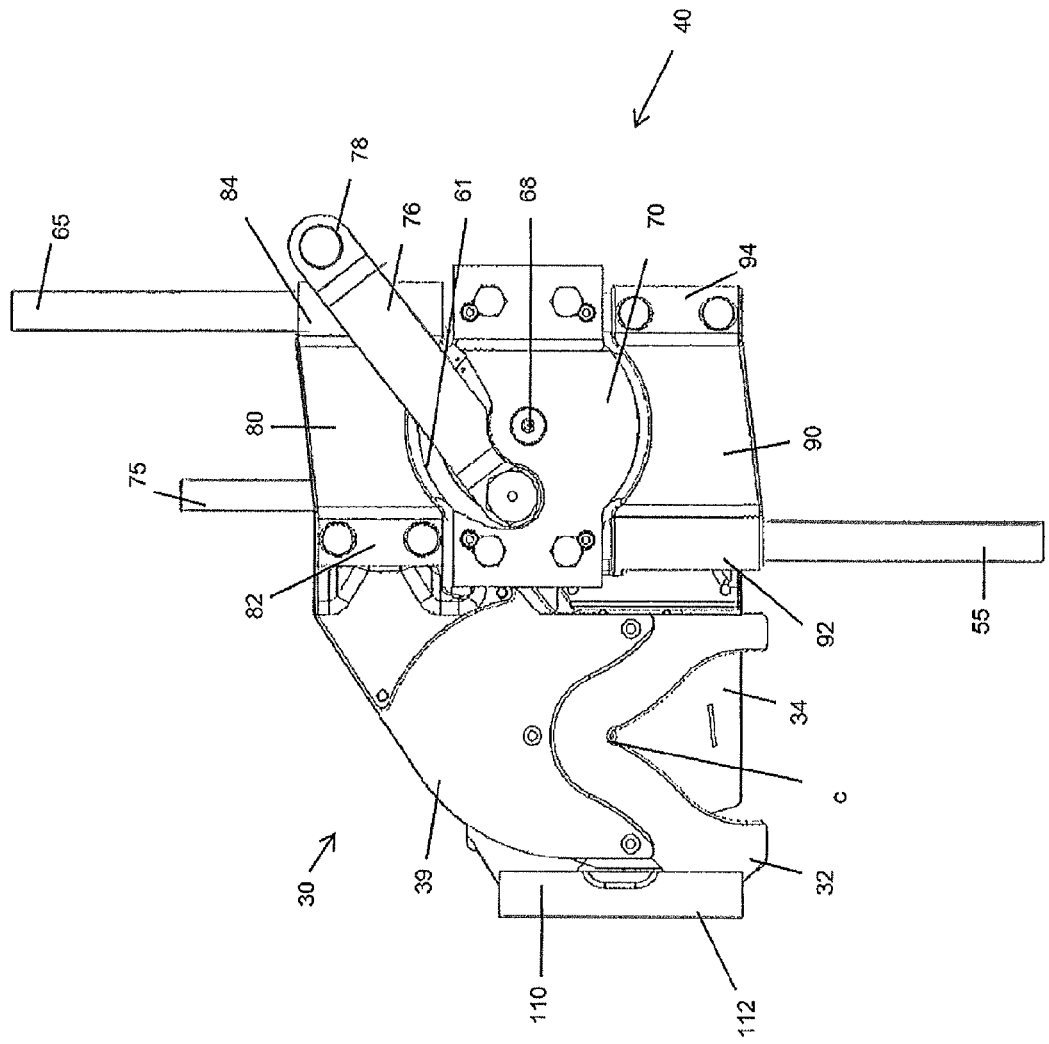
FIG. 9 shows a front view of the inventive clipping machine in a closed position.
Figure 10:
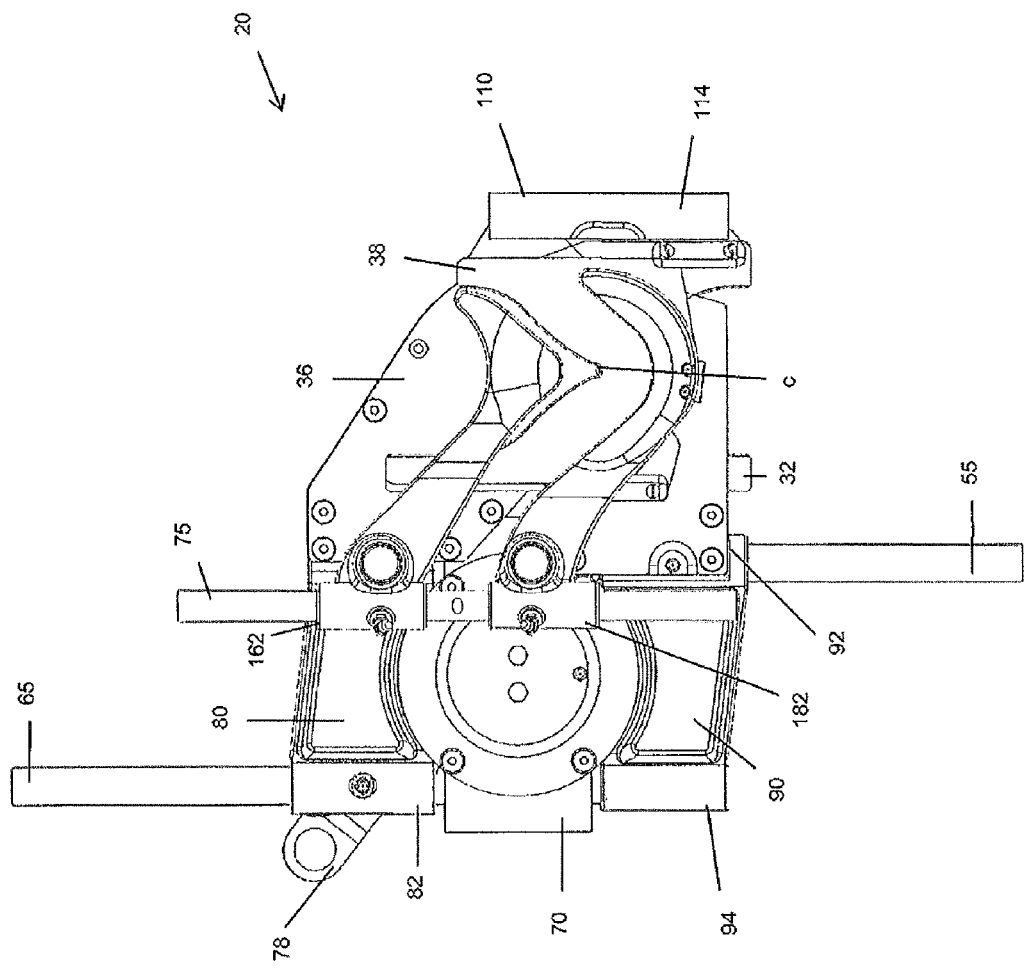
FIG. 10 shows a rear view of the inventive clipping machine in a closed position
Figure 11:
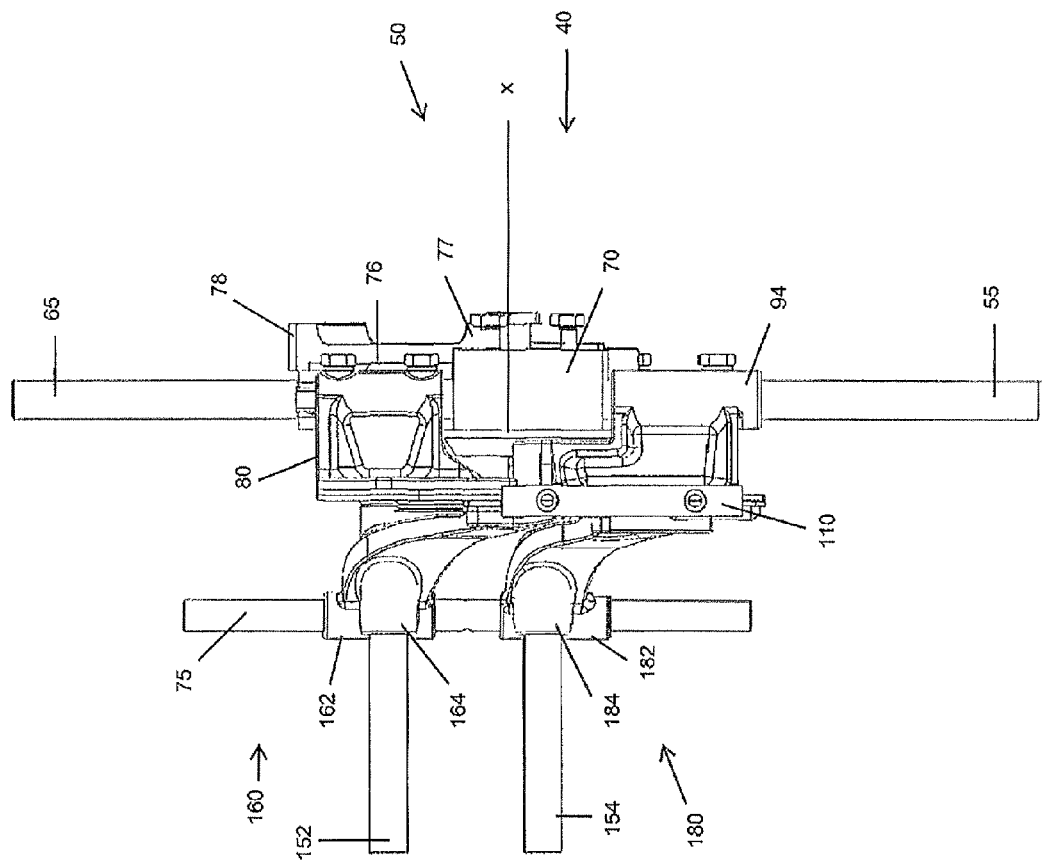
FIG. 11 shows a left-hand side view of the inventive clipping machine in a closed position.
Figure 12:
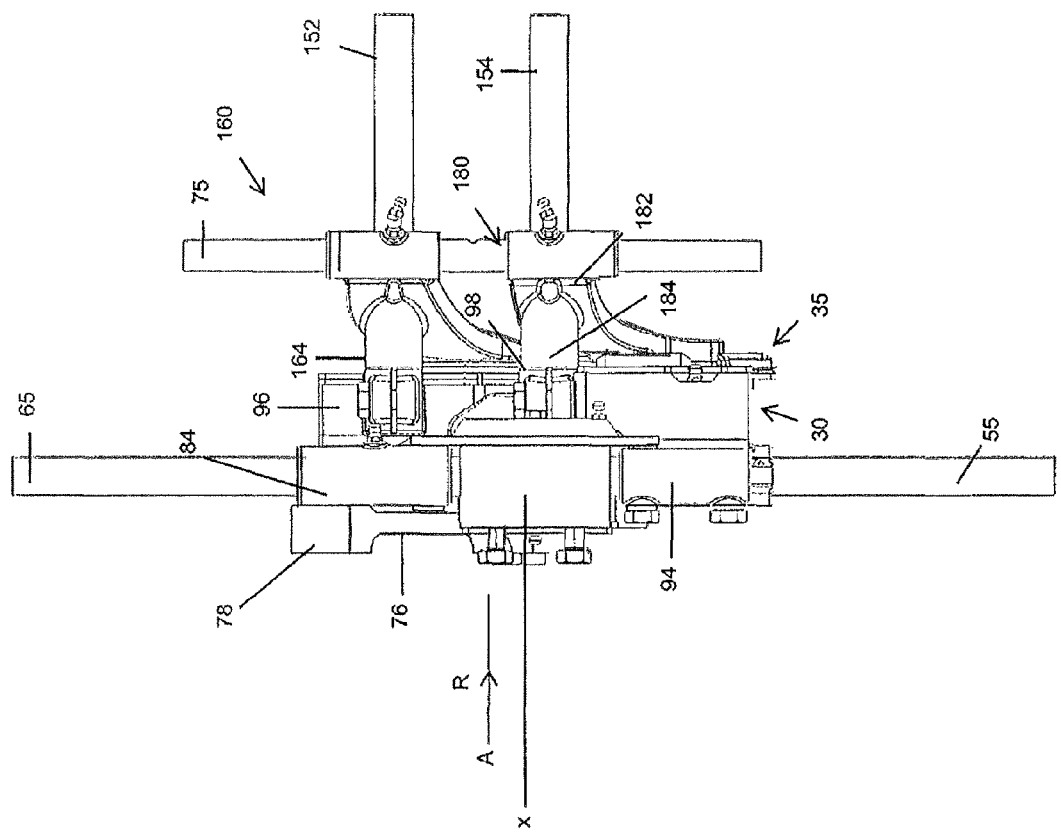
FIG. 12 shows a right-hand side view of the inventive clipping machine in a closed position.
Figure 13:
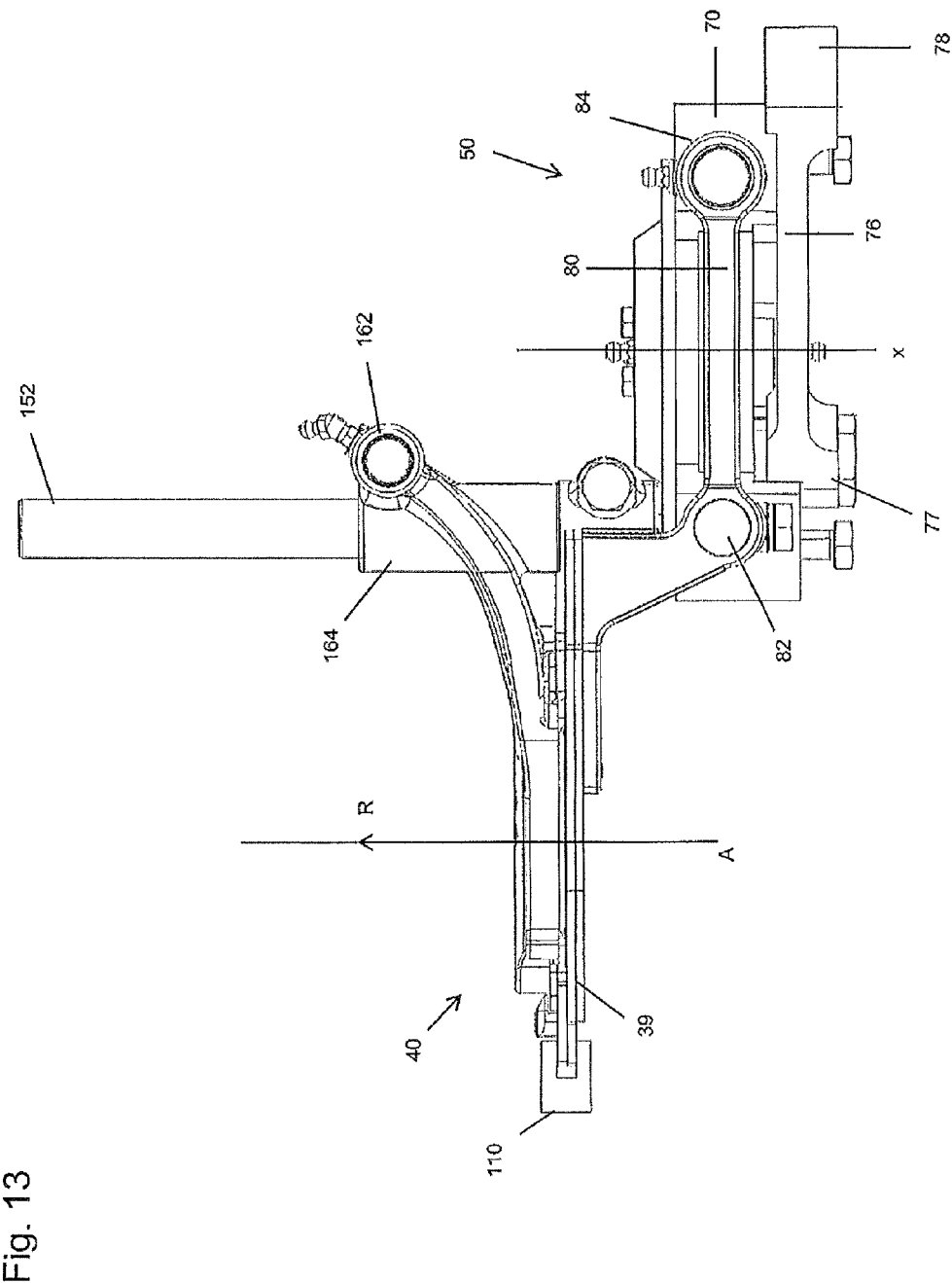
FIG. 13 shows a top view of the inventive clipping machine in a closed position.
Figure 14:
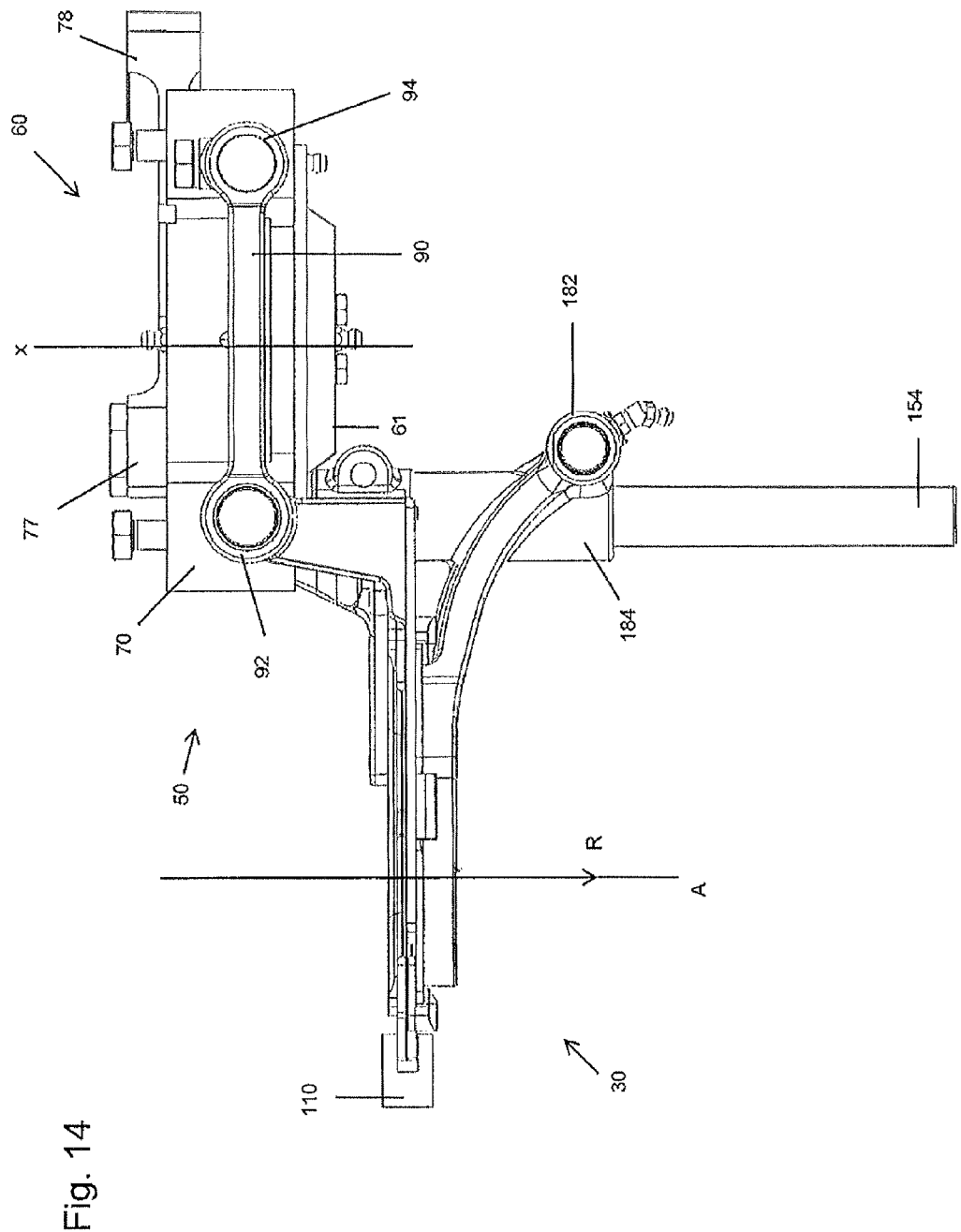
FIG. 14 shows a bottom view of the inventive clipping machine in a closed position.

FIG. 8 shows a schematic perspective view of the inventive clipping machine according to the preferred embodiment in the closed position. The closed position defines the second step to produce a plait-like portion on a tubular packaging casing.

When the clipping machine and in particular the displacer elements 32, 34, 36, 38 are in the closed position, the displacer elements 32, 34, 36, 38 are in a nearly minimum displacement to each other leaving just a small clearance C between them. Thereby, a not-shown tubular sausage casing accommodating a filling material running in direction R and through the upper and lower displacer elements 32, 34, 36, 38 in the open position is gathered by the displacer elements 32, 34, 36, 38, so that nearly all the filling material is pushed out of the clearance and to each side of the displacer unit 20.

For moving the displacer elements 32, 34, 36, 38 from the open position to the closed position the driving rod 76 is pushed forward towards the first guidance 40 and thereby drives the drive gear 61 in an anticlockwise rotary motion. As the not-shown teeth of the drive gear 61 are interacting respectively with the teeth 64a, 66a of the first and second guiding rod 55, 65 functioning as linear gear bars (racks) 64, 66, the rotary motion of the drive gear 61 is translated into a linear vertical motion of the guiding rods 55, 65. Hereby, the first guiding rod 55 is pushed downwards while the second guiding rod 65 is pushed upwards. As the guiding rods 55, 65 are connected to the connecting elements 80, 90, which again are each connected to the first and second pair of the displacer elements 30, 35 respectively, the upper and lower displacer elements 32, 34, 36, 38 are also pushed upwards respectively downwards and consequently towards each other.

The operation also works in the opposite way. When the driving rod 65 is pulled backwards away from the first guidance 40, the driving rod 76 drives the drive gear 61 in a clockwise rotary motion, so that consequently the first guiding rod 55 is pushed upwards while the second guiding rod 65 is pushed downwards. By doing so, the upper and lower displacer elements 32, 34, 36, 38 are also pushed downwards respectively upwards and consequently away from each other, in order to move the displacer elements 32, 34, 36, 38 from the closed position back into the open position.

Since the connecting elements 80, 90 are linked with the second pair of the displacer elements 35 via the horizontal slide bars 152, 154, the linear motion of the connecting elements 80, 90 are also transferred to the second pair of the displacer elements 35. When the connecting elements 80, 90 are pushed towards each other as a result of the drive gear 61 acting upon the guiding rods 55, 65, the horizontal slide bars 152, 154 are also pushed towards each other, while the vertical bushings 162, 182 slide along the third guiding rod 75. Thereby, the linear vertical motion of the upper and lower displacer elements 32, 34 of the first pair of the displacer elements 30 generated by the drive mechanism 50 is transmitted to and synchronised with the upper and lower displacer elements 34, 36 of the second pair of the displacer elements 35.

The inventive clipping machine and in particular the second pair of the displacer elements 35 can be reversible moved from its closed position (described above) to a spread position by means of the second guidance 150.

Figure 15:
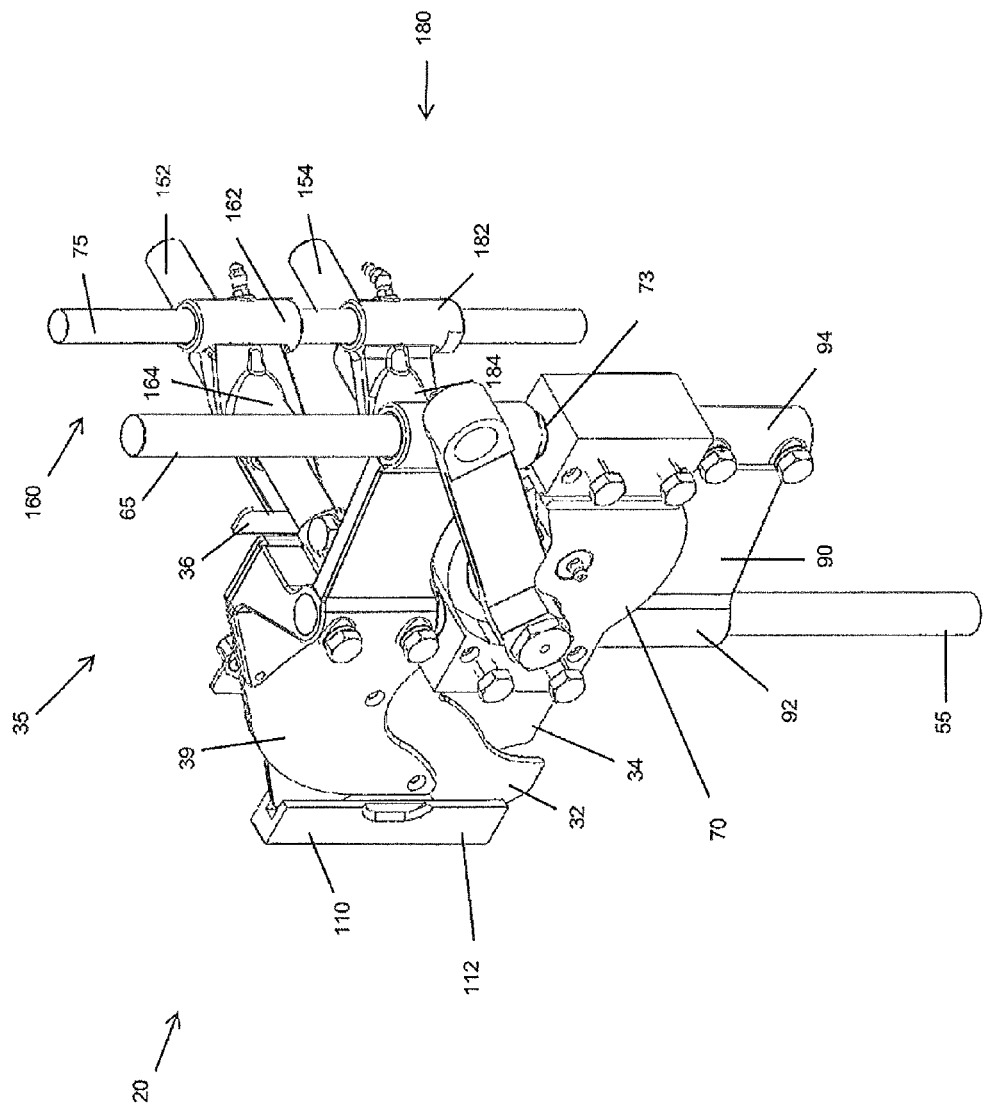
FIG. 15 shows a perspective view of the inventive clipping machine in a spread position comprising a displacer unit, a first guidance and a second guidance.
Figure 16:
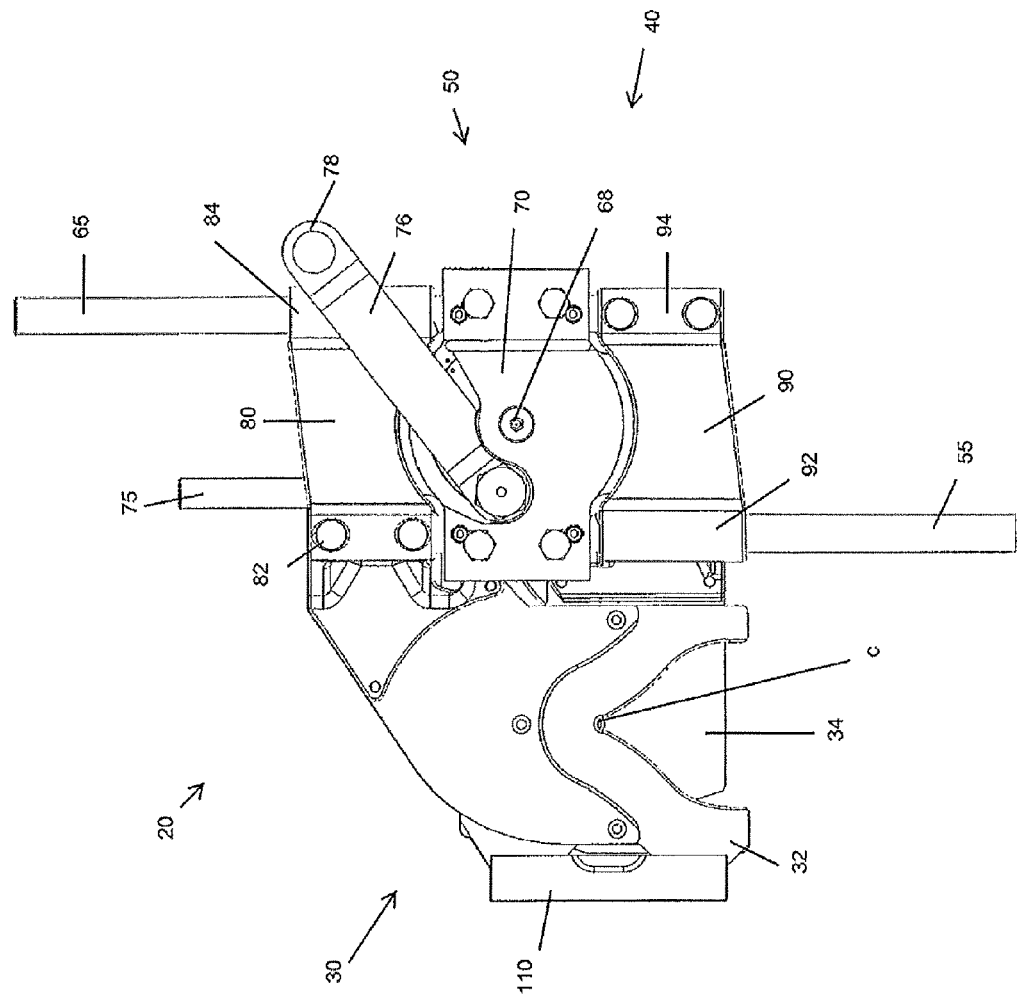
FIG. 16 shows a front view of the inventive clipping machine in a closed position.
Figure 17:
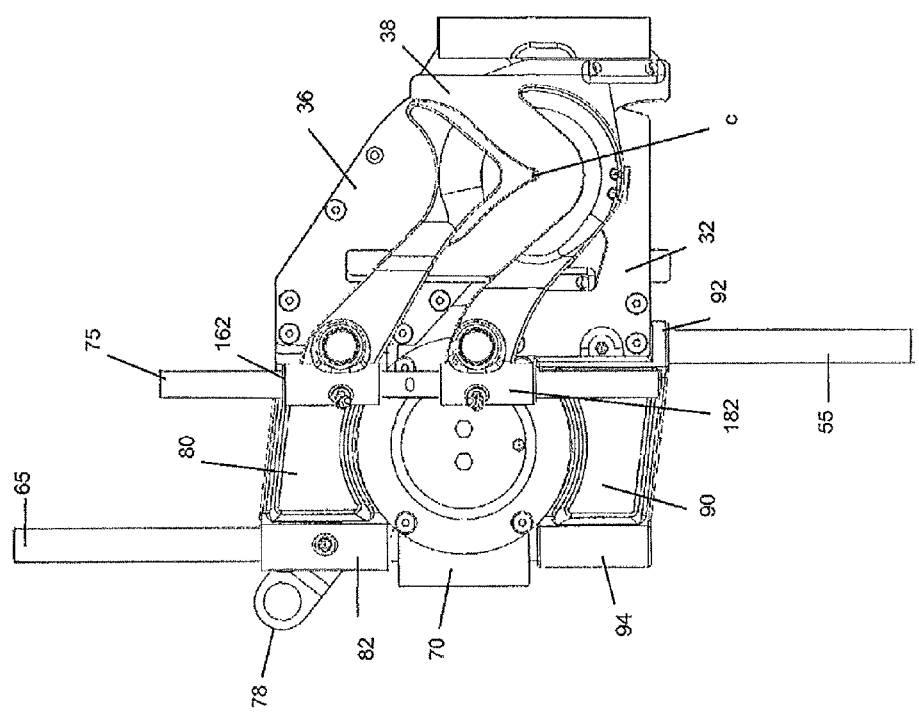
FIG. 17 shows a rear view of the inventive clipping machine in a closed position.
Figure 18:
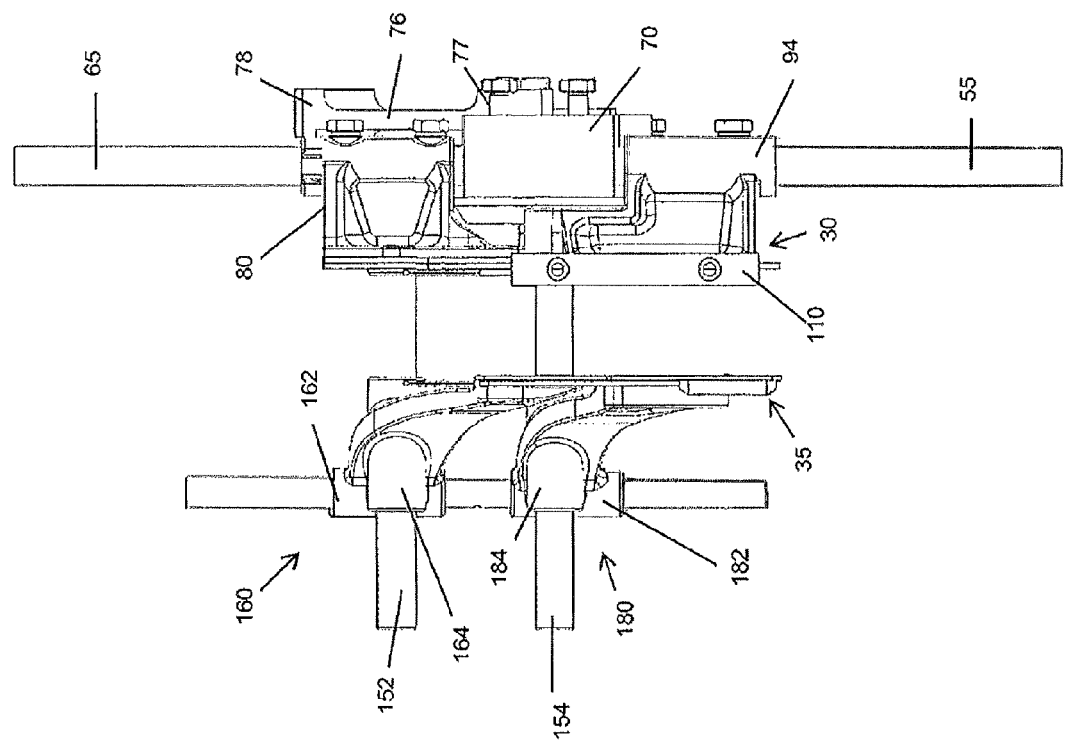
FIG. 18 shows a left-hand side view of the inventive clipping machine in a closed position.

FIG. 15 shows a schematic perspective view of the inventive clipping machine according to the preferred embodiment in the spread position. The spread position defines the third step to produce a plait-like portion on a tubular packaging casing.

After the not-shown tubular sausage casing accommodating a filling material running through the upper and lower displacer elements 32, 34, 36, 38 during the production of sausages, is gathered by the displacer elements 32, 34, 36, 38 (closed position), the second pair of the displacer elements 35 is moved away from the first pair of the displacer elements 30 driven by the not-shown second drive mechanism along the axis A in direction R, for creating a plait-like portion being at least approximately free of filling material. While the second pair of the displacer elements 35 is being moved into the spread position, the upper and lower displacer elements 36, 38 remain in its closed position. When the second pair of the displacer elements 35 are in the spread position, the upper and lower displacer elements 36, 38 are essentially in a third plane. This third plane is essentially parallel to the first and second plane created by the upper and lower displacer elements 32, 34, 36, 38 in the open and closed position.

For moving the second pair of the displacer elements 35 in the spread position and into the third plane, the second drive mechanism (not shown) is acting upon the third guiding rod 75, in order to move the third guiding rod 75 in the direction R. Since the third guiding rod 75 is linked via the linking elements 160, 180 to the second pair of the displacer elements 75, as described above, the upper and lower displacer elements 36, 38 of the second pair of the displacer elements 35 are consequently moved in the direction R. The third guiding rod 75 can to be moved horizontally along the horizontal slide rods 152, 154 as the horizontal bushings 164, 184 of the linking elements 160, 180 are able to slide along the horizontal slide bars 152, 154.

However, as already described above, it is also possible within an alternative embodiment of the present invention, to build the inventive clipping machine without the third guiding rod 75. In that case, the second drive mechanism (not shown) will be acting directly upon the first and second linking elements 160, 180 for moving the second pair of the displacer elements 35 into the spread position.

The invention claimed is:

1. Clipping machine for partitioning and closing a tubular packaging casing accommodating a filing material, in particular sausage meat, the machine comprising:

at least a first and second displacer element pair which in relation to an axis of the tubular packaging casing are arranged axially one after the other, and, which comprise each an upper displacer element and a lower displacer element wherein each pair of the displacer elements are linearly reversibly movable in a first and second plane from an open position, in which the displacer elements are in a maximum displacement to each other, to a closed position, in which the displacer elements are in a nearly minimum displacement to each other, a first linear guidance comprising at least a first and second guiding rod for guiding the two pairs of the displacer elements in the first and second plane during their reversible linear movement from the open position to the closed position, and a first drive mechanism for reversibly moving both first and second pairs of the displacer elements from the open position to the closed position, where the first and second guiding rods are positioned in a plane parallel to the first and second plane of the first and second pairs of the displacer elements, and where the second pair of the displacer elements is linearly reversibly movable between the closed position and the spread position in a third plane perpendicular to the first and second plane.

2. Clipping machine according to claim 1, where the drive mechanism is essentially positioned between the first and second guiding rod.

3. Clipping machine according to claim 1, where the first and second guiding rod are linearly guided by the drive mechanism.

4. Clipping machine according to claim 1, where the first drive mechanism is formed as a rack-and-pinion-drive comprising at least a drive gear as well as at least a first and second linear bar gear.

5. Clipping machine according to claim 4, where the drive gear is driven by a driving rod.

6. Clipping machine according to claim 5, where the drive gear comprises at least a first and a second coupling location which are connected to the driving rod alternatively to each other.

7. Clipping machine according to claim 1, where a second linear guidance is provided for guiding the second pair of the displacer elements in the third plane between the closed position and the spread position.

8. Clipping machine according to claim 7, where the second linear guidance comprises at least a first and second horizontal slide bar for synchronously guiding the two pairs of the displacer elements in the first and second plane during their reversible linear movement from the open position to the closed position as well as for guiding the second pair of the displacer elements in the third plane between the closed position and the spread position.

9. Clipping machine according to claim 1, where the displacer elements are each provided with a connecting element connecting the displacer elements to the first and second guiding rod.

10. Clipping machine according to claim 9, where each connecting element comprises at least one adapter for holding the second linear guidance.

11. Clipping machine according to claim 1, where a third guiding rod is provided for guiding the second pair of the displacer elements in the first and second plane during their reversible linear movement from the open position to the closed position.

12. Clipping machine according to claim 11, where at least a first and second linking element is provided for linking the second pair of the displacer elements with the third guiding rod and respectively with each of the horizontal slide bars.

13. Clipping machine according to claim 1, where a guide unit is provided for guiding the first pair of the displacer elements.

14. Clipping machine according to claim 1, where the first pair of the displacer elements comprises a reinforcing element which is essentially shaped as the upper displacer element.

* * * * *